United States Patent [19]

Nakashima et al.

[11] Patent Number: 4,569,549
[45] Date of Patent: Feb. 11, 1986

[54] ROBOT HAND FOR INDUSTRIAL ROBOTS

[75] Inventors: Seiichiro Nakashima, Hino; Nobutoshi Torii, Hachioji; Hitoshi Ozaki, Hino, all of Japan

[73] Assignee: Fanuc Limited, Hino, Japan

[21] Appl. No.: 582,660

[22] Filed: Feb. 23, 1984

[30] Foreign Application Priority Data

Feb. 28, 1983 [JP] Japan .................. 58-31002

[51] Int. Cl.$^4$ .............................. B66C 1/42
[52] U.S. Cl. ...................... 294/88; 294/116
[58] Field of Search .......... 294/88, 86 R, 93, 97, 294/103 R, 104, 106, 111, 115, 117, 118; 269/27, 34, 228, 239; 901/31, 36, 37, 39

[56] References Cited

U.S. PATENT DOCUMENTS 3,901,547  8/1975  Skinner .................. 294/88
4,234,223  11/1980  O'Neil .................... 294/88

Primary Examiner—James B. Marbert
Attorney, Agent, or Firm—Armstrong, Nikaido, Marmelstein & Kubovcik

[57] ABSTRACT

A robot hand adapted to be secured to the extremity of a robot arm or a robot wrist of an industrial robot has a finger operating unit provided with a fluid pressure operated piston reciprocating in a cylinder body and a piston rod integral with the piston and having a finger mount, and at least two finger units detachably attached to the finger operating unit. Each finger unit has a fixed finger member and a movable finger member.

8 Claims, 5 Drawing Figures

4,569,549

ROBOT HAND FOR INDUSTRIAL ROBOTS

BACKGROUND OF THE INVENTION

1. Field of the Invention

The present invention relates to the structure of a hand for an industrial robot, and more particularly, relates to a robot hand of a type in which the number of fingers can be changed in order to adequately grasp a workpiece, taking into account a change in the shape of the workpiece. That is, for example, the number of fingers on the robot hand can be changed from three to two when the shape of the workpiece is changed from round to square or polygonal.

2. Description of the Prior Art

Industrial robots are used for conducting various types of operation under the control of a robot controller, and conventionally, must use different types of hands depending upon the change in the type of operation. Therefore, an industrial robot is usually provided with a set of several different robot hands, each hand being adapted for only a predetermined type of operation to be carried out by the industrial robot. Thus, in response to each change in the type of operation, the robot hand attached to the industrial robot is changed to another type of hand. For example, when the industrial robot is used for conveying workpieces from one position to another, a robot hand having three opening and closing fingers is employed if the workpieces are round. On the other hand, if the workpieces are square or polygonal, a robot hand having two opening and closing fingers is used.

This changing of one robot hand for another is conducted under the control of the robot controller, which is programmed for this hand-changing operation before placing the industrial robot into operation. However, the scope of application for industrial robots has become very much wider and, thus, the frequency of changing the robot hands has increased, making the programming of the controller for the hand-changing operation extremely complex.

SUMMARY OF THE INVENTION

An object of the present invention is to provide a robot hand of a type in which the number of opening and closing fingers can be changed, thereby enabling an industrial robot to adequately grasp workpieces, regardless of the change in the shape of the workpieces, without changing the robot hand.

In accordance with the present invention, there is provided a robot hand adapted for attachment to the extremity of the robot arm or the wrist of an industrial robot comprising: a finger operating unit provided with a cylinder body having a hollow chamber, a piston reciprocally fitted in the chamber of the cylinder body, a piston rod extending from the piston to an outer end thereof outside the cylinder body, and a means for reciprocating the piston by the use of a fluid under pressure. The hand is also comprised of at least two finger units, each comprising a fixed finger detachably attached to an outer circumference of the cylinder body, and a movable finger pivotally connected to an end of the fixed finger and detachably attached to the outer end of the piston rod. Further, there are included means for removably attaching the two finger units to the cylinder body and the piston rod of the finger operating unit.

Preferably, the robot hand is provided with three finger units attached to the finger operating unit when the robot hand is used for grasping workpieces in the shape of a ball or a cylindrical rod.

Furthermore, the fluid under pressure which is used for operating the piston is preferably a pressurized air supplied from a pressurized air source, such as a compressor.

BRIEF DESCRIPTION OF THE DRAWINGS

The present invention will be made clearer from the ensuing description of a preferred embodiment thereof with reference to the accompanying drawings, wherein.

DESCRIPTION OF THE PREFERRED EMBODIMENTS

Figure 1:
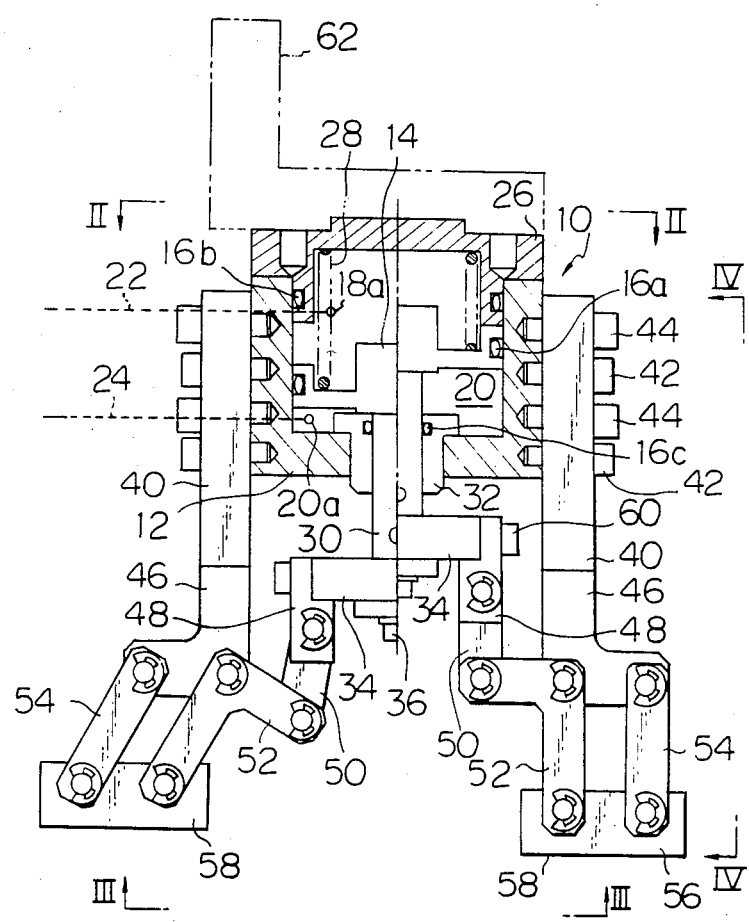
FIG. 1 is a front view, in part cross-section, of a robot hand of a type in which the number of fingers can be changed, according to the present invention.

Referring to FIGS. 1 through 5, the central section of a robot hand 10 is provided with a cylinder body 12, in which a piston 14 is mounted in such a manner as to be capable of reciprocating in the axial direction, i.e., in the vertical direction in FIG. 1. The piston 14 has a sealing member 16a comprised of an O-ring received in a groove formed in the outer circumference of the piston 14. The piston 14 is snugly and slidably fitted inside the cylinder body 12, and defines an upper cylinder chamber 18 on one side and a lower cylinder chamber 20 on the other side, within the cylinder body 12. The upper and lower cylinder chambers 18 and 20 are alternately supplied with pressurized air from an external source, so that the piston 14 reciprocates within the cylinder body 12. Ports 18a and 20a are formed in the cylinder body 12 for permitting the entrance of the pressurized air into and the discharge of the pressurized air from the upper and lower chambers 18 and 20. The ports 18a and 20a are connectable to a pressurized air source by conduits 22 and 24, respectively, and an appropriate switching valve (not illustrated). The top of the cylinder body 12 is formed with an upper opening closed by a lid 26 tightly fixed to the top face of the cylinder body 12 by screw bolts. A sealing member 16b comprised of an O-ring is arranged between the inside wall of the cylinder body 12 and the cylindrical part of the lid 26, to keep the upper chamber 18 airtight. Inside the airtight upper chamber 18 is provided a compression spring 28 with one end seated against the inside face of the lid 26 and the other end seated against the upper face of the piston 14. In the illustrated embodiment, the compression spring 28 acts to push the piston 14 away from the lid 26. Therefore, when both the upper and lower cylinder chambers 18 and 20 are not supplied with pressurized air, the piston 14 is held at its lowermost position, as shown in the left half of FIG. 1, by the force of the compression spring 28. The compression spring 28 also acts to promote the movement of the piston 14 away from the lid 26 when the supply of pressurized air is switched from the lower chamber 20 to the upper chamber 18. If it is preferred that the piston 14 be normally held at its uppermost position, adjacent to the lid 26, the compression spring 28 should be arranged between the lower face of the piston 14 and the bottom of the cylinder body 12. The piston 14 is provided with a piston rod 30 projecting downward and extending through the central bore of a bush 32 fixed to the lowest section of the cylinder body 12. A sealing member 18c, i.e., an O-ring, is provided to keep airtight the clearance between the central bore of the bush 32 and the piston rod 30. As a result, leakage of the pressurized air from the lower chamber 20 is prevented. A finger mount 34 in the form of a plate member is fixed to the lower end of the piston rod 30. In the illustrated embodiment, the finger mount 34 formed as a separate hexagonal plate member (FIG. 3) is fixed to the lower end of the piston rod 30 by a screw bolt 36. The finger mount 34 has a thickness suitable for rigidly supporting the finger units, described later. The cylinder body 12 is formed as a hexagonal hollow column member having six sides which are used, in cooperation with the finger mount 34, for mounting the finger units. Further, the cylinder body 12 together with the reciprocatory piston 14 and the piston rod 30 are assembled to form a finger operating unit for opening and closing the fingers.

The robot hand 10 is provided with a plurality of finger units 40 mounted on and supported by the cylinder body 12 and the finger mount 34. In the illustrated embodiment, three finger units 40 are disposed equiangularly about the center of the cylinder body 12 of the finger operating unit. Each finger unit 40 comprises a fixed finger member 46 detachably attached to one of the six sides of the cylinder body 12 by screw bolts 42 and positioning pins 44, and a movable finger 58 formed as a link structure having a pair of first links 48, a pair of second links 50, a pair of third links 52, a pair of fourth links 54, and a finger-tip holder 56. Each of the pair of first links 48 of the movable finger 58 has one end attached to the finger mount 34 of the finger operating unit by screw bolts 60 and the other end pivotally connected to the pair of second links 50. Each of the second links 50 are pivotally connected to one extreme end of the paired bellcrank-like third links 52 which are in turn pivotally connected, at their middle points to the lower inward end of the fixed finger 46, and at their other extreme ends to the finger tip holder 56. The paired fourth links 54 are pivotally connected to the lower outward end of the fixed finger 46 and to the finger tip holder 56. Note, the movable finger 58 is a link structure having the first through fourth links, and it is able to perform opening and closing motions in the radial direction with respect to the center of the robot hand 10 in accordance with the vertical reciprocating movement of the piston 14 and the piston rod 30 of the finger operating unit. Also note that the three finger units 40 equiangularly attached to the outer circumference of the hexagonal hollow column cylinder body 12 simultaneously perform the same motions, i.e., opening and closing motions, in accordance with the reciprocating movement of the piston rod 30. The finger tip holder 56 of each movable finger 58 has a finger tip (not illustrated in FIGS. 1 through 5) attached thereto by appropriate fixing means, such as screw bolts. Therefore, in the illustrated embodiment, the robot hand 10 is formed as a robot hand having three finger units 40 and three finger tips. As illustrated in FIG. 1, the robot hand 10 can be provided with a known safety coupling 62 by which the robot hand 10 is attached to the front end of a robot arm or to a robot wrist of an industrial robot (not illustrated in FIG. 1).

Figure 2:
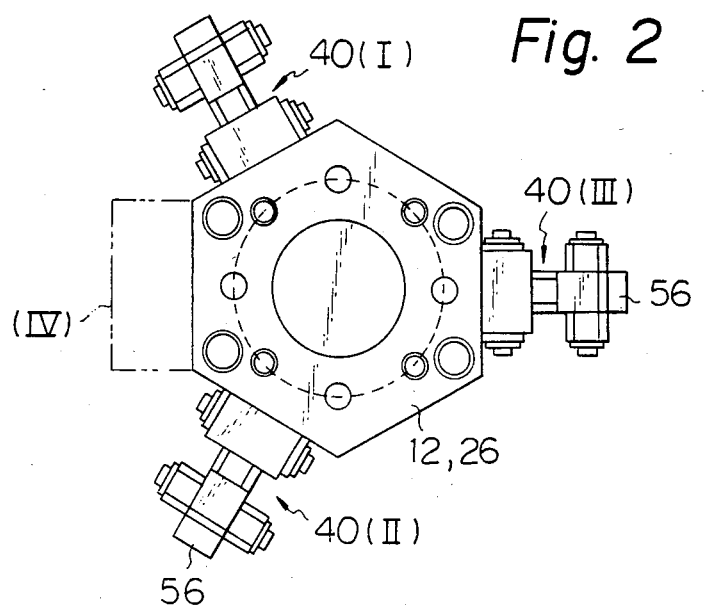
FIG. 2 is a top view taken from the line II—II in FIG. 1.
Figure 3:
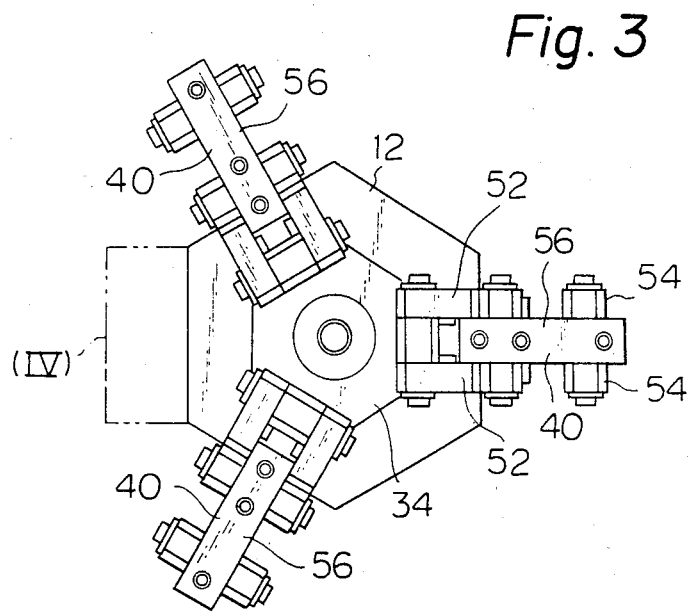
FIG. 3 is a bottom view taken from the line III—III in FIG. 1.

Referring particularly to FIGS. 2 and 3, since the robot hand 10 is provided with three finger units 40 disposed equiangularly with respect to the center of the hexagonal cylinder body 12, the hand 10 can be used for grasping a workpiece in the shape of a ball, a round cylinder, a round disk, and the like. However, when the robot hand 10 is to be used for grasping a workpiece in the form of a square column or a thick plate, the robot hand 10 should be provided with two finger units 40 disposed so as to confront one another. This is because the disposition of the two confronting finger units 40 will enable the robot hand 10 to firmly grasp the workpiece by the use of the clamping action of the two finger units 40.

Figure 5:
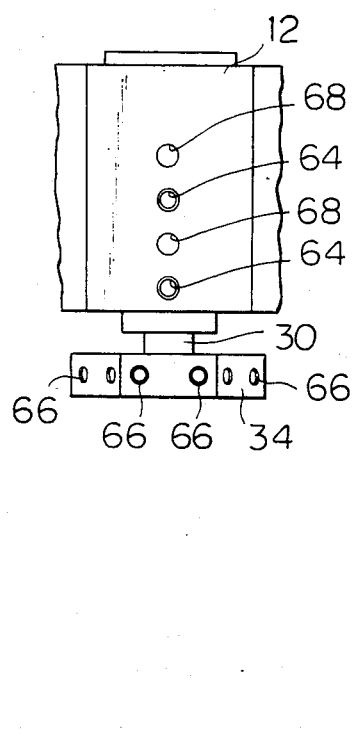
FIG. 5 is the same side view as shown in FIG. 4 but with the finger unit shown in FIG. 4 removed.
Figure 4:
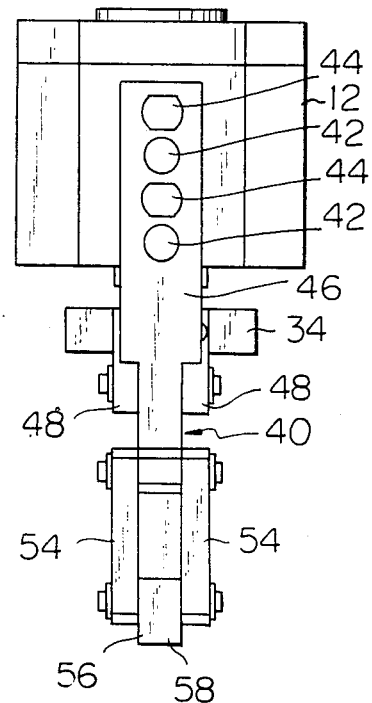
FIG. 4 is a side view taken from the line IV—IV in FIG. 1.

In accordance with the present invention, since each finger unit 40 is detachably attached to the cylinder body 12 and the finger mount 40 of the finger operating unit, it is possible to readily change the number of the finger units 40 attached to the finger operating unit of the robot hand 10. For example, when the robot hand 10 with three finger units 40 as shown in FIGS. 2 and 3 should be changed to the robot hand with two finger units 40, the two finger units 40 attached to the finger operating unit at the positions (I) and (II) shown in FIGS. 2 and 3 are removed while the finger unit 40 at the position (III) is left as it is. One of the removed finger units 40 is then again attached to the finger operating unit at the position (IV) diametrically confronting the position (III). To facilitate the changing of the number of finger units, the cylinder body 12 and the finger mount 34 of the finger operating unit should be formed with threaded holes 64 and 66, in which the screw bolts 42 and 60 for fixing the finger unit 40 are engaged, as well as straight holes 68 into which the positioning pins 42 are inserted, as illustrated in FIG. 5. Preferably, these threaded holes 64 and 66 and the straight holes 68 should be formed in each of the six sides of the cylinder body 12 and the finger mount 34. Note, the positioning pins 42 and the straight holes 68 are able to ensure the attachment of the finger units 40 to the fixed positions of the cylinder body 12 even if the finger unit changing operation is repeated. This guarantees the invariable positioning of the finger units 40 with respect to the center of the robot hand 10.

From the foregoing, it will be understood that according to the present invention, there is provided a robot hand of the type in which the number of grasping fingers can be readily changed depending on the change in the operation modes of the industrial robot or on the shape of the workpieces to be grasped by the robot hand. Thus, the grasping of the workpieces by the robot hand can be firm and adequate. Also, since each finger unit is light in weight, it is very easy for an operator to attach the finger unit to and to detach the same from the robot hand. This contributes to the easy fitting of a desired type of robot hand in response to different kinds of robot operation. The robot hand of the present invention eventually contributes to the reduction in the manufacturing cost of the industrial robots, since the robot hand can be used over a wide range of applications only by changing the number of fingers attached to the hand.

Note, a person skilled in the art will be able to readily make, without departing from the scope and sprit of the present invention, an alternation such that the finger operating unit is operated by a pressurized fluid other than the described pressurized air.

What is claimed is:

1. A robot hand adapted for being attached to the extremity of the robot arm or the wrist of an industrial robot comprising:
   a finger operating unit provided with a hexagonal body having therein a chamber, a piston reciprocally fitted in the chamber of said body, a piston rod extending from said piston to an outer end thereof outside said body and means for reciprocating said piston by the use of a fluid pressure;
   at least two finger units, each comprising a fixed finger detachably attached to an outer circumference of said body and a movable finger pivotally connected to an end of said fixed finger and detachably attached to said outer end of said piston rod; and
   means for removably attaching said at least two finger units to said body and said piston rod of said finger operating unit.

2. A robot hand according to claim 1, wherein said finger operating unit further has a resilient means provided in said chamber of said body for constantly urging said piston toward one of two axial ends of said chamber.

3. A robot hand according to claim 1, wherein said piston rod is provided, at said outer end thereof, with a finger mount to which said movable finger of each said finger units is attached.

4. A robot hand according to claim 3, wherein said finger mount is formed as a substantially hexagonal plate member disposed coaxially with said hexagonal body and having six external sides to which each said movable finger is capable of being attached.

5. A robot hand according to claim 1, wherein said movable finger of each said finger unit comprises a link structure having therein a plurality of link members pivotally connected to one another.

6. A robot hand according to claim 1, wherein said means for reciprocating said piston comprises means for alternately introducing said fluid under pressure into two chamber sections of said chamber separated by said piston.

7. A robot hand according to claim 6, wherein said fluid under pressure is a pressurized air.

8. A robot hand according to claim 1, wherein said means for removably attaching said at least two finger units comprises positioning pins for removably securing said finger units to predetermined positions on said finger operating unit, and screw bolts for fixing said finger units to said predetermined positions on said finger operating unit.

* * * * *